United States Patent [19]

Razzano

[11] 3,997,496
[45] Dec. 14, 1976

[54] PROCESS FOR THE PREPARATION OF FLUOROSILICONE POLYMERS AND COPOLYMERS

[75] Inventor: John S. Razzano, Watervliet, N.Y.

[73] Assignee: General Electric Company, Waterford, N.Y.

[22] Filed: May 12, 1975

[21] Appl. No.: 576,702

[52] U.S. Cl. .................. 260/46.5 R; 260/46.5 G
[51] Int. Cl.$^2$ ..................................... C08G 77/04
[58] Field of Search .............. 260/46.5 R, 46.5 G, 260/18 S

[56] References Cited

UNITED STATES PATENTS

| | | | |
|---|---|---|---|
| 3,094,497 | 6/1963 | Hyde | 260/46.5 G X |
| 3,110,689 | 11/1963 | Smith | 260/18 S |
| 3,160,601 | 12/1964 | Hyde | 260/46.5 G |
| 3,853,932 | 12/1974 | Razzano | 260/46.5 G UX |

*Primary Examiner*—Lewis T. Jacobs
*Attorney, Agent, or Firm*—John L. Young; E. Philip Koltos; Edward A. Hedman

[57] ABSTRACT

Diorganopolysiloxane homo- and copolymers having a viscosity from 2,000 to 200,000,000 centipoise at 25° C., are produced by reacting a composition of (i) a silanol end-stopped perfluoroalkyl-substituted organopolysiloxane having 3 to 5 units, alone, or admixed with (ii) a second silanol end-stopped diorganopolysiloxane having 3 to 5 units, (i) being present in an amount of 20 to 100 mole % of the composition, in the presence of a non-bond-rearranging catalyst and removing the formed water of condensation.

13 Claims, No Drawings

PROCESS FOR THE PREPARATION OF FLUOROSILICONE POLYMERS AND COPOLYMERS

FIELD OF THE INVENTION

The present invention relates to a process for producing fluorine-containing diorganopolysiloxane homo- and copolymers from mixtures of low molecular weight silanol end-stopped siloxanes.

BACKGROUND OF THE INVENTION

In U.S. Pat. No. 3,853,932, the applicant herein has disclosed and claimed a process for converting the fluorosilicone cyclic siloxane trimer, 2,4,6-tris(3,3,3-trifluoropropyl)-2,4,6-trimethylcyclotrisiloxane, to the corresponding linear "trimer diol", HO$\pm$(CF$_3$CH$_2$CH$_2$(CH$_3$)SiO)$_{\overline{x}}$H, wherein $x$ averages 3 to 5, using an acid-activated hydroaluminum silicate clay in the presence of water. It has now been unexpectedly discovered that this "trimer diol" can be condensed to high molecular weight polymers and copolymers in high yield without the formation of any appreciable quantities of cyclics.

Such a result is completely unexpected because Brown, U.S. Pat. No. 3,373,138, teaches that a trifluoropropyl diol of the same average composition of the "trimer diol" cannot be condensed to high molecular weight polymer without the formation of large quantities of cyclics. Moreover, the Brown patent teaches that a linear fluorosilicone of the same average composition as the "trimer diol" must be aged in contact with an aqueous solution of above pH 7 for several hours to three months to form at least the hexamer diol. Hexamer diol and higher diols can then be condensed to high molecular weight with the formation of only small amounts of cyclic by-products.

According to the present invention, a trimer diol as described in the U.S. Pat. No. 3,853,932 can be converted to high molecular weight polymer by adding a non-rearranging condensation catalyst such as tin salts of carboxylic acids, amines, and amine salts and removing the formed water of condensation. Polymers of penetration of more than 100 (0.1 mm/min) can be produced by this process proving that the molecular weight is high enough for the preparation of silicone rubber.

Moreover, by combining a fluorosilicone "trimer diol" with a corresponding diorgano, e.g., dimethyl silicone diol, which is miscible with the fluorosilicone oil, and then adding such a condensation catalyst, fluorosilicone-methyl copolymers and block copolymers can be easily produced. For example, copolymers can be produced at not only 25, 50, 75, and 90 mol % trifluoropropylorganosiloxy content, but also at any other composition.

The process of this invention provides ready access to fluorosilicone copolymers of more than 20 mol % fluoro silicone content at high molecular weights. Previously, if the full solvent resistance offered by a 100 mol % trifluoropropyl polymer was not needed, then the fluorosilicone was blended with a diorganopolysiloxane gum. However, a copolymer of trifluoropropyl and an organosilicone has been found to have better solvent resistance than a fluorosilicone/organosilicone blend at the same fluorosilicone content and thus the present process provides a superior product.

It is, accordingly, a principal object of the present invention to provide a process for producing fluoroalkyl-substituted diorganopolysiloxane homo- or copolymer gums in high yield, using a low molecular weight silanol end-stopped polysiloxane, and especially those produced from cyclic trisiloxanes by reaction with water in the presence of an acid-treated clay.

Another object of the present invention is to provide fluorine-containing diorganopolysiloxane homo-and copolymer gums having a viscosity from 2,000 to 200,000,000 centipoise at 25° C. by a process comprising polymerizing a silanol end-stopped fluorine-substituted low molecular weight siloxane trimer, alone, or in admixture with a silanol endstopped co-monomer in the presence of a non-bond-rearranging catalyst.

A further object of the present invention is to provide fluorine-containing diorganopolysiloxane copolymer gums having a viscosity from 2,000 to 200,000,000 centipoise at 25° C., wherein at least one of the co-monomers comprises 20 to 98 mol % of the copolymer units, and includes organo groups attached to the silicon atoms having at least 3 carbon atoms, and, particularly, a —CH$_2$CH$_2$R$^7$ substituent group, where R$^7$ is a perfluoroalkyl group.

SUMMARY OF THE INVENTION

In accordance with the foregoing objects, the present invention provides a process for producing a diorganopolysiloxane having a viscosity of from 2,000 to 200,000,000 centipoise at 25° C. comprising (A) reacting a composition comprising (i) a silanol end-stopped diorganopolysiloxane of the formula,

wherein R is methyl, ethyl, vinyl or phenyl and R$^1$ is CH$_2$CH$_2$R$^7$ wherein R$^7$ is a perfluoroalkyl group of from 1 to 6 carbon atoms and $x$ is 3 or a multiple thereof, but averages from 3 to 5.

(ii) a silanol end-stopped diorganopolysiloxane of the formula,

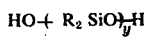

wherein R is, independently, as above, and $y$ is 3 or a multiple thereof, but averages from 3 to 5, (i) being present in an amount of from 20 to 100 mol % of the composition, in the presence of a non-bond-rearranging catalyst and removing the formed water of condensation, and (B) recovering the desired product.

A preferred embodiment comprising forming the starting materials (i) and (ii) by (a) contacting the corresponding cyclic trimer with an acid-activated hydroaluminum silicate clay, in the presence of water, and a polar solvent, and (b) separating the desired silanol end-stopped diorganopolysiloxane. Such a method is fully described in the above-mentioned U.S. Pat. No. 3,853,932, the disclosure of which is incorporated herein by reference.

It is to be understood that $x$ and $y$ can be whole numbers or they can represent average numbers within the stated range. Typically, when starting with cyclic trimers, a mixture of silanol end-stopped materials will be obtained in which the linear trimer diol predominates. Enough of the higher condensates are present, however, to generally skew the values of $x$ and $y$ upward, e.g., toward an average value of 4, 4.5 and 5.

It is preferred to obtain the product homo- or copolymer in essentially pure form, after the polymerization step is complete by heating the mixture to 150° to 200° C. at a vacuum of 1 to 100 millimeters of mercury to strip off all volatiles. The polymerization reaction will require in general from ¼ hour to 20 hours and, more preferably, from 50 minutes to 12 hours.

The optional co-monomer (ii) will also be a silanol end-stopped diorganopolysiloxane, although it is contemplated that blocks of up to 7 or 10 units can be present. These are provided by methods shown in the above-mentioned U.S. Pat. No. 3,853,932. Preferably, however, in (i) and (ii), $x$ and $y$ are from 3 to 5, and especially preferably, $x$ will be about 4.5 and $y$ about 3 to 5. In copolymerizations, the amount of co-monomer (i) in admixture with (ii) will vary between 20 and 96 mol %. Preferably, (i) will comprise from 25 to 90 mol % of (i) and (ii). The process readily provides diorganopolysiloxane homo- and copolymer gums of from 2,000 to 200,000,000 centipoise viscosity at 25° C. depending on whether or not, for example, a chainstopper is employed.

Any conventional non-bond-rearranging catalyst can be used, but preferably, it will be a tin salt of a carboxylic acid, an amine, or an amine salt. Especially preferred is dibutyl tin dilaurate.

DETAILED DESCRIPTION OF THE INVENTION

The R substituent in the silanol end-stopped siloxanes (i) and (ii) above, are, independently, methyl, ethyl, vinyl or phenyl. These are well known as substituents on silicon atoms in polysiloxanes. Also known are those in which the $R^1$ substituent contains 3 carbon atoms, or more. In the formula (i) above, $R^1$ is fluorinated alkyl, such as 3,3,3-trifluoropropyl, 4,4,4,3,3-pentafluoro-1-butyl, and the like, of 3 to 8 carbon atoms. Most preferably, the $R^1$ is 3,3,3-trifluoropropyl, and R is methyl or ethyl, especially preferably, methyl. A small amount of vinyl substituent is often desirable to assist in cross-linking when the gums are to be used in elastomers.

The catalyst used in this invention is any conventional non-bond-rearranging catalyst which will promote condensation between SiOH functional groups. If desired, mutual solvents may be used to increase the solubility of the catalyst in the siloxane. One class of catalyst include metal salts of monocarboxylic acids such as lead 2-ethyl octoate, dibutyl tin diacetate, dibutyl tin di-2-ethyl hexoate, dibutyl tin dilaurate, butyl tin tri-2-ethyl hexoate, iron 2-ethyl hexoate, cobalt 2-ethyl hexoate, manganese 2-ethyl hexoate, zinc 2-ethyl hexoate, stannous octoate, tin naphthenate, zirconium octoate, antimony octoate, bismuth naphthenate, tin oleate, tin butyrate, zinc naphthenate, zinc stearate and titanium naphthenate. The stannous carboxylates and certain orthotitanates and partial condensates thereof are preferred.

Another class of catalyst are titanium esters such as tetrabutyltitanate, tetra-2-ethylhexyltitanate, tetraphenyltitanate, tetraoctadecyltitanate, triethanolaminetitanate, octyleneglycoltitanate and bisacetylacetonyldiisopropyltitanate.

Additional suitable catalysts include amines such as hexylamine, dodecylamine, and amine salts such as hexylamine acetate, dodecylaminephosphate and quarternary amine salts such as benzyltrimethylammonium acetate.

For the purpose of this invention, the amount of catalyst is not critical but is normally present in an amount of from 0.1 to 2 percent based on the weight of the starting materials.

Starting materials (i) and (ii) can be obtained by the described method. The corresponding trisiloxane will be contacted with an acid-activated hydroaluminum silicate clay in the presence of water and a polar solvent and separating the desired product after the hydrolysis.

To obtain the highest efficiency, it is preferred that the cyclic trisiloxane, the water and the polar solvent be present in a uniform homogeneous phase. If there is not a homogeneous phase, then the yield will be reduced and/or the reaction time will be extended.

Although almost any aprotic polar solvent may be utilized, the preferred polar solvents are acetone, dioxane, tetrahydrofuran, which have a boiling point of from 50° to 80° C.

The acid-activated hydroaluminum silicate clay is preferably one of the acid-activated montomorillonite clays which may be activated either with sulfuric acid or hydrochloric acid. Such clays are manufactured and sold by Filtrol Corporation, Los Angeles, California under the trademark "Filtrol".

Generally, in the first step of the process, i.e., contacting the homogeneous phase of water, cyclic trisiloxane and polar solvent with the acid-activated hydroaluminum silicate clay, it is preferred that there be utilized 0.1 to 10 parts of the acid-activated hydroaluminum silicate clay per 100 parts of the trisiloxane, 0.5 to 10 parts of the polar solvent per part of the cyclic trisiloxane and 0.1 to 1 part of water per part of the cyclic trisiloxane. Although other amounts above the maximum amounts indicated above may be used, they form no useful purpose and require the utilization of excess equipment. Preferably, the reaction is carried out in the temperature range of 50° to 80° C. for a period of 2 to 20 hours.

To recover the starting materials of Formula (i) or (ii), there can be added from 0.1 to 5 parts of diatomaceous earth to the siloxane mixture as a filtering aid and the resulting siloxane, water, polar solvent mixture is filtered to remove the acid activated clay catalyst. Then the siloxane, water, polar solvent mixture is transferred to a stripping kettle maintained at a temperature of 20° to 60° C. under pressure of 100 to 200 millimeters of mercury. All the acetone is stripped off and recycled for use. Then the siloxane water mixture is subjected to a temperature in the range of 100° to 140° C. at a pressure of 10 to 100 millimeters of mercury to strip off all the water and the low boiling siloxanes, specifically, the cyclic siloxanes and cyclic trisiloxanes, which were not converted to the low molecular weight silanol-terminated diorganopolysiloxanes (i) and (ii).

To prepare the homo- or copolymers, the silanol end-stopped polysiloxanes, (i) and (ii) above, are placed in a vessel. Optionally, a solvent, such as perfluorooctane $C_8F_{18}$, can be added too. The amount of catalyst and the reaction temperature are conventional. Typically, however, there will be used from 0.1 to 2 percent of catalyst based on the total of (i) and (ii). Preferably, the polymerization will be carried out at a temperature of from 0° to 160° C. and more preferably, at a temperature of 90° to 150° C. Water of condensation will be removed as formed, e.g., by entrainment in a stream of dry nitrogen or by refluxing into an azeotropic trap (if a solvent is used), or by vacuum stripping during condensation.

The silanol end-stopped siloxane composition of Formulae (i) and (ii) above, and the catalyst are maintained at the indicated temperature range for from ½ hour to 20 hours, preferably, 50 minutes to 12 hours, during which time polymerization or copolymerization is substantially complete. At this point, 70 to 92% by weight or more of the siloxane starting material will have been converted to the desired diorganopolysiloxane homo- or copolymer gum.

The viscosity of the homo- or copolymer can be controlled by adding a molecular weight regulator to the composition of co-monomers (i) and (ii) and condensation catalyst. Such a regulator can be, for example, a very low molecular weight trimethylsiloxy and silanol end-stopped polydimethylsiloxane, e.g., a reaction product in dimethyl formamide dimethyl cyclic trimer with trimethyl chlorosilane, said reaction product being hydrolyzed. The highest molecular weight will be obtained without regulator. Anything short of full condensation will be an silanol end-stopped material of a desired molecular weight. The more regulator that is added, the lower the molecular weight.

The process of this invention produces linear diorganopolysiloxane homo- or copolymer gums in which each silicon atom in the respective units has an R or $R^1$ substituent group, as the case may be. The product gum will have a viscosity of between 2,000 and 200,000 centipoise at 25° C. Obviously, the homo- and copolymer gums can be formulated, e.g., by mixing with reinforcing fillers, such as fumed silica or precipitated silica; extending fillers, such as zinc oxide, iron oxide, titanium oxide, diatomaceous earth, and the like; heat aging additives, such as iron oxide; pigments, and other additives, such as flame retardants, for instance, platinum, by itself, or in combination with other materials and self-bonding additives, such as for instance, triallylisocyanurate. The homo- and copolymer gums can also be mixed into a uniform mass to which is added a curing agent, e.g., a perioxide curing agent, such as benzoyl peroxide or dicumyl peroxide. The resulting composition can be cured at elevated temperatures, e.g., from 100° to 300° C., or they can be cured by radiation to produce a homo- or copolymer silicone elastomers, having enhanced resistance to swelling by hydrocarbon and other solvents.

DESCRIPTION OF THE PREFERRED EMBODIMENTS

The following examples are for the purpose of illustrating the present invention. They are not to be construed to limit the invention in any manner whatsoever.

EXAMPLE 1

In a 1 liter, 3-neck flask is placed 200 parts of acetone, 200 parts of 1,3,5-trimethyl-1,3,5-tris(3,3,3-trifluoropropyl)cyclotrisiloxane, 20 parts of water and 4 parts of acid washed clay. The contents of the flask are mechanically agitated and brought to reflux temperature. After 4 hours of reflux, a 5 cc sample is taken and 0.7 parts of anhydrous $MgSO_4$ is added to the sample and the sample filtered. The filtrate is transferred to a watch glass and placed in a vacuum oven for 10 minutes at 100° C. and 25 mm Hg. A drop of the oil is placed on a sodium chloride plate and an infrared spectrum taken. The spectrum shows a strong silanol adsorption but also shows a strong adsorption at 9.8 microns — a band characteristic of cyclic siloxane trimers. The reaction is continued with samples removed and tested as above at the end of 8 and 12 total hours of reflux. The sample at the end of 12 total hours indicates essentially no cyclic trimer remains in the reaction. The reaction is cooled to room temperature and 4 parts of diatomaceous earth is added. The pot contents are filtered and the filter is washed with 25 cc of acetone. The filtrate is transferred to a 500 cc flask in two successive portions with the solvent being removed on a rotary evaporator at 60° C. and 40 mm Hg. The flask temperature is finally raised to 100° C. and held there for 15 minutes. The product oil plus the oil isolated during the three samplings weighs 189 parts, 95 percent yield. Proton magnetic resonance analysis of the final diol confirms that the average chain length is 4.5 methyltrifluoropropylsiloxy units.

One hundred parts of the silanol end-stopped product are mixed with 0.1 g. of dibutyl tin dilaurate and the mixture is heated at 110° C. for 16 hours. Water of reaction distills off and is collected. The final product comprises 3,3,3-trifluoropropyl methyl polysiloxane gum of 120,000,000 centipoise viscosity at 25° C. This gum has a penetration of >100 (0.1 mm./min) and is suitable for use in formulating silicone elastomers, having high resistance to swelling in hydrocarbon fluid, such as JP-4 jet aircraft engine fuel.

EXAMPLE 2

The procedure of Example 1 is repeated, substituting for dibutyl tin dilaurate catalyst, and equivalent amount of tributylamine octoate. A high polymer is also formed.

EXAMPLE 3

The ring opening procedure of Example 1 is repeated, substituting hexamethylcyclotrisiloxane and the corresponding low molecular weight silanol end-stopped trimer diol (ii) is obtained, having an average chain length of 3 to 5, as above defined.

A fluorosilicone copolymer is prepared by adding 100 parts of a 90:10 mol % mixture of the silanol end-stopped 3,3,3-trifluoropropyl methyl siloxane (i) of Example 1 and the silanol end-stopped dimethylpolysiloxane (ii) to a reaction flask with 0.1 part of dibutyl tin dilaurate. The mixture is heated at 120° C. for 12 hours. The product is stripped of volatiles at 155°–160° C. at 1–2 mm Hg vacuum. The copolymer product has a viscosity of 80,000,000 centipoise at 25° C.

The volume % swell of the copolymer (filled 40 phr of fumed silica and 3 phr of benzoyl peroxide, cured 20 min. at 300° F and post-cured for 1 hour at 400° F) upon immersion in JP-4 hydrocarbon is 14.9%, significantly less than that of a rubber similarly prepared from the corresponding 90:10 fluorosilicone/methylsilicone homopolymer blend, 17.9%.

EXAMPLE 4

The procedure of Example 3 is repeated, substituting a 75:25 mol % mixture of silanol end-stopped trifluoropropylmethyl:dimethylsiloxanes. The corresponding fluorosilicone copolymer is obtained in good yield. The volume % swell of the cured rubber product in JP-4 hydrocarbon is 21.3%, significantly less than that of the corresponding cured rubber product of 50:50 fluorosilicone/methylsilicone homopolymer blend, 26.2%.

EXAMPLE 5

The procedure of Example 3 is repeated, substituting a 50:50 mol % mixture of silanol end-stopped trifluoropropylmethyl:dimethylsiloxanes. The corresponding fluorosilicone copolymer is obtained in good yield. The volume % swell of the cured rubber product in JP-4 hydrocarbon is 50.3%, significantly less than that of the corresponding cured rubber product from a 50:50 fluorosilicone/methylsilicone homopolymer blend, 65.8%.

The above detailed description is seen to provide simple and stright-forward procedure for producing high molecular weight diorganopolysiloxane homo- and copolymer gums from low molecular weight silanol end-stopped siloxanes. Such homo- and copolymer gums may be advantageously used to produce silicone elastomers having outstanding properties such as, for instance, increased resistance to degradation by oil, as compared to silicon elastomers formed from diorganopolysiloxane gums where the organo groups are mostly composed of low molecular weight and aromatic substituent groups such as methyl or vinyl. The copolymers resist solvent swelling more efficiently than blends of homopolymers at the same fluorine content.

Obviously, many variations will suggest themselves to those skilled in the art. All such obvious variations are within the full intended scope of the invention as defined in the appended claims.

I claim:

1. A process for producing a diorganpolysiloxane having a viscosity of from 2,000 to 200,000,000 centipoise at 25 C. comprising (A) reacting a composition comprising
  (i) a silanol end-stopped diorganopolysiloxane of the formula,

wherein R is methyl, ethyl, vinyl or phenyl and $R_1$ is $CH^2CH^2R_7$ wherein $R_7$ is a perfluoroalkyl group of from 1 to 6 carbon atoms and x is from 3 to 5, and
  (ii) a silanol end-stopped polysiloxane of the formula,

wherein R is, independently, as above and y is from 3 to 5, (i) being present in an amount of from 20 to 100 mol % of the composition, in the presence of a non-bond-rearranging catalyst and removing the formed water of condensation, and (B) recovering the desired product.

2. A process as defined in claim 1 wherein the non-bond-rearranging catalyst is a tin salt of a carboxylic acid, an amine or an amine salt.

3. A process as defined in claim 2 wherein the non-bond-rearranging catalyst is dibutyl tin dilaurate.

4. A process as defined in claim 1 including the step of forming the silanol end-stopped diorganopolysiloxanes (i) and (ii) by (a) contacting the corresponding cyclic trimer with an acid-activated hydroaluminum silicate clay, in the presence of water and a polar solvent, and (b) separating the desired silanol end-stopped diorganopolysiloxane.

5. A process as defined in claim 1 wherein the silanol end-stopped diorganopolysiloxane composition is reacted with the catalyst for from hour to 20 hours.

6. A process as defined in claim 1 wherein $R^1$ is $CF_3CH_2CH_2$.

7. A process as defined in claim 1 wherein $R^1$ is $CF_3CH_2CH_2-$; R is methyl; and x and y are from 3 to 5.

8. A process as defined in claim 7 wherein x is about 4.5 and y is from 3 to 5.

9. A process as defined in claim 1 wherein component (i) comprises 100 mol % of the composition.

10. A process as defined in claim 1 wherein component (i) is present in an amount of from 20 to 96 mol % of the composition.

11. A process as defined in claim 1 wherein component (i) is present in an amount of from 25 to 90 mol % of the composition.

12. A process as defined in claim 7 wherein component (i) is present in an amount of from 25 to 90 mol % of the composition.

13. A process for producing a diorganopolysiloxane having a viscosity of from 2,000 to 200,000,000 centipoise at 25 C. comprising
  A. reacting a composition comprising
    i. a silanol end-stopped polysiloxane of the formula:

$$HO\text{+}R\ R^1SiO\text{)}_{\overline{x}}H$$

wherein R is $CF_3CH_2CH_2 -$, R is methyl, and x is from 3 to 5, and
    ii. a silanol end-stopped polysiloxane of the formula $$HO\text{+}R_2SiO\text{)}_{\overline{y}}H$$

wherein R is methyl and y is from 3 to 5,
      i. being present in an amount of from 20 to 96 mol % of the composition, in the presence of dibutyl tin dilaurate catalyst and removing the formed water of condensation, and
  B. recovering the desired product.

* * * * *

UNITED STATES PATENT AND TRADEMARK OFFICE
CERTIFICATE OF CORRECTION

PATENT NO. : 3,997,496
DATED : December 14, 1976
INVENTOR(S) : John S. Razzano

It is certified that error appears in the above—identified patent and that said Letters Patent are hereby corrected as shown below:

In Col. 7, line 34, after "25" and before "C." , insert a degrees sign (°).

In Col. 8, line 15, after "from" and before "hour" , insert -- 1/4 --; on line 35, after "25" and before "C." , insert a degrees sign (°); on line 41, after "R", first occurrence, and before "is" , first occurrence, insert a superscript "1".

Signed and Sealed this

Twenty-sixth Day of April 1977

[SEAL]

Attest:

RUTH C. MASON
Attesting Officer

C. MARSHALL DANN
Commissioner of Patents and Trademarks